Dec. 28, 1965

R. L. ATKINSON ETAL 3,225,375

CLEANING DEVICE

Filed Aug. 21, 1963

4 Sheets-Sheet 1

INVENTORS:
Ralph L. Atkinson
BY Patrick A. Florio

Morrison, Kennedy & Campbell
ATTORNEYS.

CLEANING DEVICE

Filed Aug. 21, 1963 4 Sheets-Sheet 2

INVENTORS:
Ralph L. Atkinson
Patrick A. Florio
BY
Morison, Kennedy & Campbell
ATTORNEYS.

Dec. 28, 1965 R. L. ATKINSON ETAL 3,225,375

CLEANING DEVICE

Filed Aug. 21, 1963 4 Sheets-Sheet 3

INVENTORS:
Ralph L. Atkinson
Patrick A. Florio
BY
Morrison, Kennedy & Campbell
ATTORNEYS.

Dec. 28, 1965 R. L. ATKINSON ETAL 3,225,375
CLEANING DEVICE
Filed Aug. 21, 1963 4 Sheets-Sheet 4
FIG. 18.
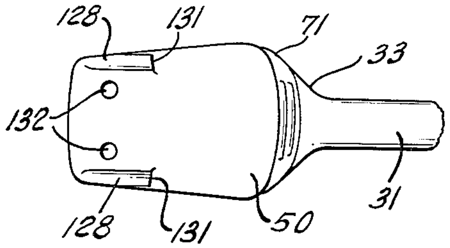
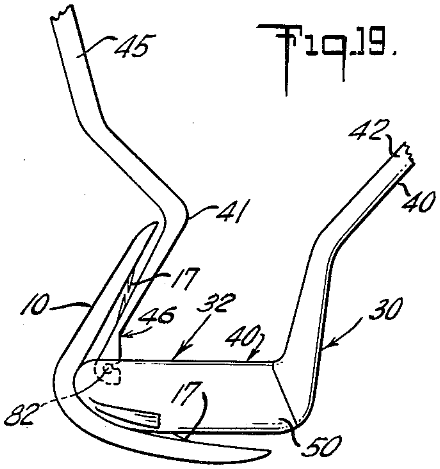
FIG. 20. FIG. 21.
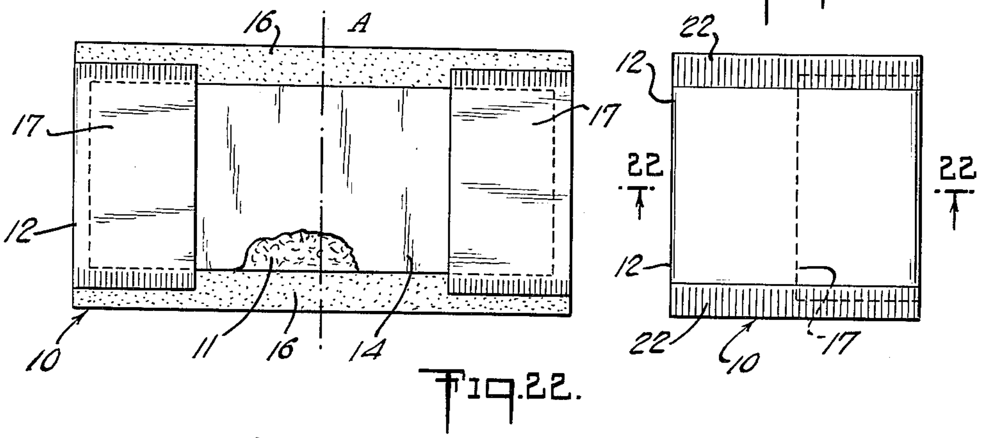
FIG. 22.
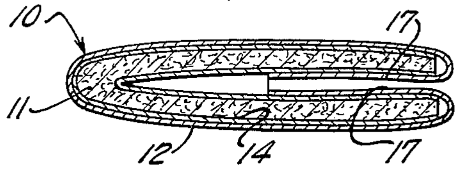
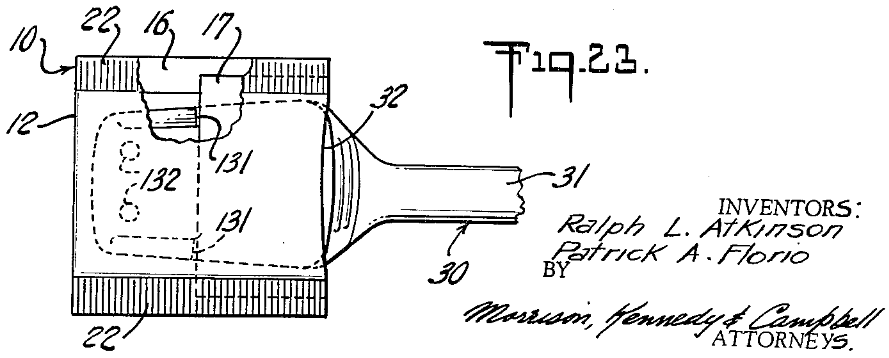
INVENTORS:
Ralph L. Atkinson
Patrick A. Florio
BY
Morrison, Kennedy & Campbell
ATTORNEYS.

United States Patent Office 3,225,375
Patented Dec. 28, 1965

3,225,375
CLEANING DEVICE

Ralph L. Atkinson, Westfield, and Patrick A. Florio, Short Hills, N.J., assignors to Johnson & Johnson, a corporation of New Jersey Filed Aug. 21, 1963, Ser. No. 303,532
12 Claims. (Cl. 15—210)

The present invention relates to a holder for a disposable cleaning swab suitable for cleaning toilet bowls, bath tubs and the like.

U.S. Patent Nos. 2,816,311 and 2,998,614 disclose a cleaning device comprising a holder having a handle and a head, and a disposable swab, which is in the form of a cover for the head, and which presents the outside or scrubbing surface of the cleaning device. This cover swab, because of its small mass and composition, is readily flushable in a toilet bowl and is internally provided with means which interlock with locking conformations on the head of the holder. The holder is split along its length into two sections pivoted together at the toe or forward end of the head for lateral separation from their closed normal swab receiving position to expand and rupture the cover swab after use.

The general object of the present invention is to provide a new and improved cleaning device holder of the general type disclosed in the aforesaid patents.

A more specific object of the present invention is to provide a new and improved cleaning device holder of the general type disclosed in the aforesaid patents, which affords sufficient flexibility and resiliency in the head to effect its close soft conformance with the irregular and intricate contours of the fixtures to be cleaned, such as those presented by toilet bowls, bath tubs and the like, which has its head designed and contoured to accommodate more smoothly and easily the swabs ordinarily employed compared with known types of holders, which has a head designed to retain the swab thereon effectively against slippage, folding and rolling even under the roughest of usage, which is designed to afford a maximum of comfort in handling with a minimum of fatigue, which is designed to so orient its vectors of forces in the manipulation thereof as to attain a maximum of cleaning pressure in the center of those areas of the holder head which ordinarily bear against the fixture being cleaned, which is constructed of a plurality of parts designed to permit their easy assembly and their firm retention in assembled conditions, and which is constructed of separate parts designed to attain desirable resiliency and coverage in that part which bears against the fixture in the cleaning thereof, and desirable rigidity and expanse in the other part or parts which require structural strength to transmit cleaning pressure to said resilient part and to support said resilient part.

Various other objects of the invention are apparent from the following description and from the accompanying drawings, in which FIG. 1 is a side view of the cleaning device holder embodying the present invention, and shows in full lines the holder closed in position ready to receive a cleaning swab thereon, and in dot and dash lines, the cleaning swab on the head of the holder, and the holder partially open in position to rupture the swab for detachment from the holder head for subsequent disposal;

Figure 14:
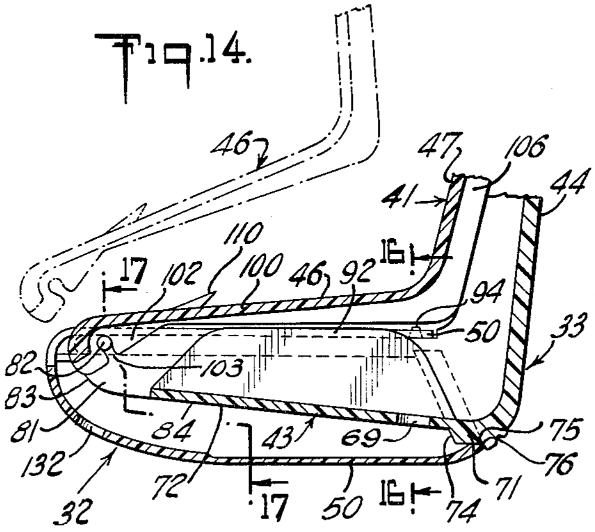
FIG. 14 is a longitudinal center section of the complete holder head and shows in dot and dash lines the upper rigid hinged member of the head detached from the lower rigid hinged member.
Figure 16:
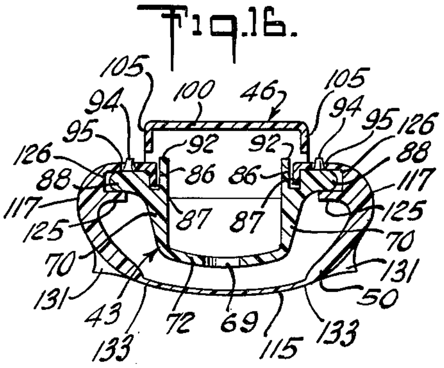
Figure 15:
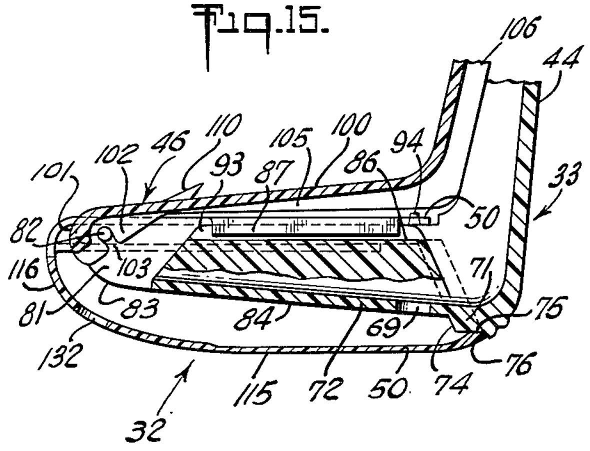
FIG. 15 is a longitudinal center section of the complete holder head but shows part of the lower rigid hinged member broken away to reveal part of the structure behind the broken part.
Figure 17:
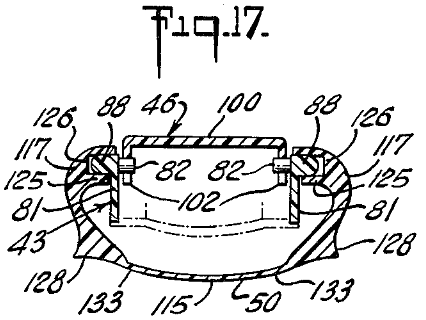

FIGS. 16 and 17 are transverse sections of the holder head taken on lines 16—16 and 17—17 respectively of FIG. 14;

FIG. 18 is a bottom view of the holder head covered with the resilient boot;

FIG. 19 is a side view of the combined holder head and cleaner swab showing the manner in which the hinged members are opened to rupture the swab for detachment from the holder head for subsequent disposal;

FIG. 20 is a face view of the cleaning swab with which the holder of the present invention may be used and shows the cleaning swab just before it is folded into its final shape and sealed into bag shape;

FIG. 21 is a face view of the cleaning swab in completed form;

FIG. 22 is a section of the cleaning swab taken on lines 22—22 of FIG. 21, but on a larger scale; and FIG. 23 is a bottom face view of the head of the holder shown in closed position with the cleaner swab attached thereto and shown with part of the swab broken away to reveal the interlocking engagement between the holder head and the cleaner swab.

Referring to FIGS. 20–23 of the drawings, there is shown a cleaner swab 10, which, per se, forms no part of the present invention, and which may be used in connection with the holder of the present invention. This swab 10, which is shown in detail in U.S. Patent No. 2,816,311 is folded from a flat composite laminated pad made up of a filler 11 in the form of a flat flexible mat and a flexible wrap sheet 12 therefor. The filler mat 11 serves as the padding for the swab and is desirably made of soft fluff material, which is readily flushable in a toilet bowl, so that it will not clog the plumbing. Desirably, it should be made of an absorbent material readily disintegrable when wet, as for example, macerated cellulose, such as wood pulp, molded or pressed in flat rectangular form.

To retain the particles of the filler mat 11 against rapid disintegration or separation during manufacture, storage, transportation, or use, a sheet 14 of thin paper, such as facial tissue, self-disintegrable when wet, is wrapped around the filler mat.

The wrap sheet 12 is of flexible paper easily flushable in a toilet bowl but nevertheless rugged and strong enough to withstand cleaning or scrubbing pressure during use. The filler mat 11 before the laminated pad 11, 12, 14 is folded is in flat rectangular form and the wrap sheet 12 is rectangular except for rectangular corner cutouts, as disclosed in the aforesaid patent. The wrap sheet 12 in this pad is wider than the filler mat 11 to define longitudinal edge margins 16 on said sheet projecting beyond said mat and is longer than said filler mat to define end sections 17 projecting beyond the filler mat. The edge margins 16 have on their inner surfaces adhesive, such as a thermosetting resin, urea-formaldehyde or polyvinyl acetate being suitable for that purpose.

The end sections 17 of the wrap sheet 12 are folded inwardly over the ends of the filler mat 11 and sheet 14 to retain said mat in proper position on said wrap sheet and to define flaps, intended to be latched to projections or catches on the holder head, when the swab 10 is slipped over said head, as will be more fully described hereinafter.

The pad, after assembly into a flat condition as shown in FIG. 20 and as described, is folded along its transverse center line A to bring the flaps 17 together in face to face contact. By application of heat and pressure, the facing juxtaposed overlapping margins 16 are secured together by the thermoplastic adhesive on these margins to form plain lap seams 22 along the sides of the pad, thus forming the swab 10 in the form of a bag or pouch, with the wrap sheet 12 on the outside defining a scrub sheet and with the filler mat 11 on the inside forming a lining or backing for the scrub sheet. The adhesive along the side seams of the bag swab 10 is strong enough to hold the seams 22 together, while the swab is undergoing the usual period of use, but is weak enough to permit rupture of the swab easily along the seams when the swab is wet and ready for disposal and when the head of the holder is expanded in the manner to be described.

Details of the swab 10 not disclosed herein are set forth in the aforesaid Patent No. 2,816,311.

Figures 1, 2, 3, 4:
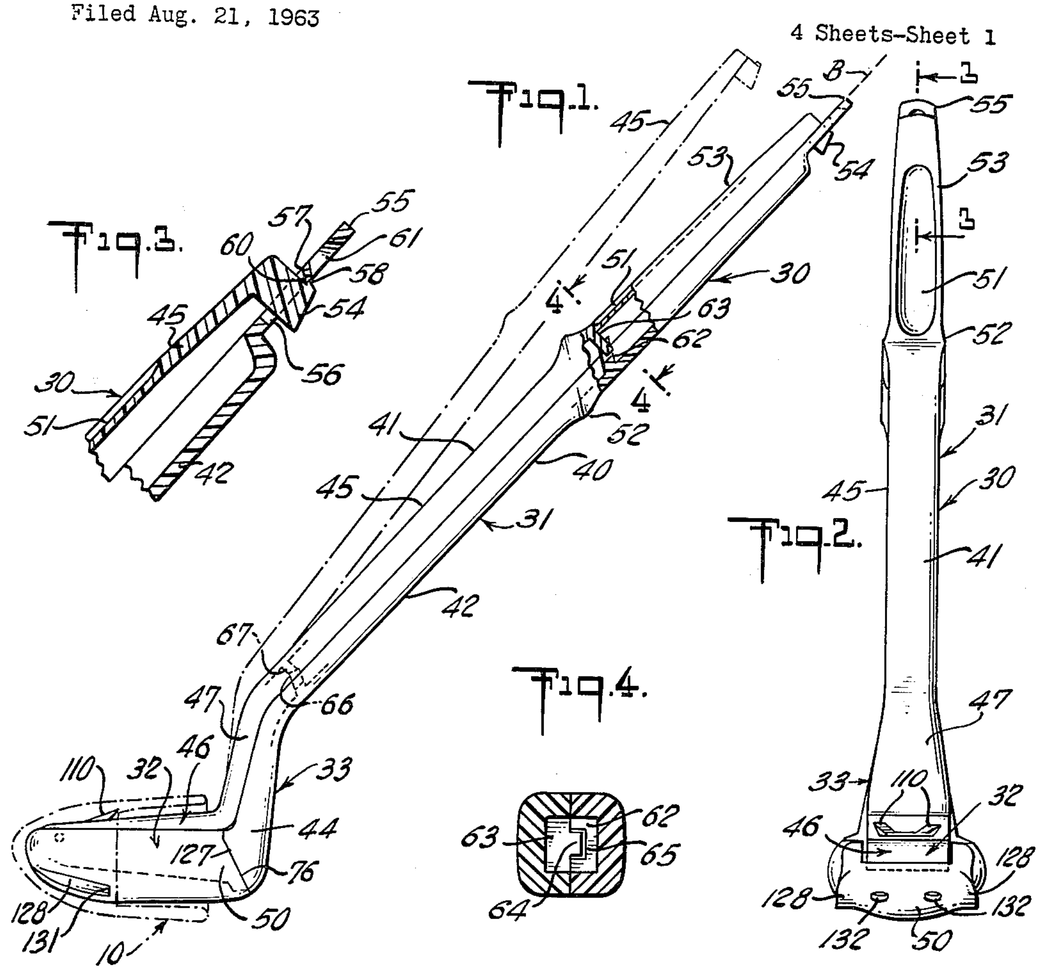
FIG. 2 is a front view of the cleaning device holder.
FIG. 3 is a detail longitudinal section of the top portion of the handle of the holder taken on lines 3—3 of FIG. 2.
FIG. 4 is a detail transverse section of the handle of the holder taken on lines 4—4 of FIG. 1, but on a larger scale.
Figure 5:
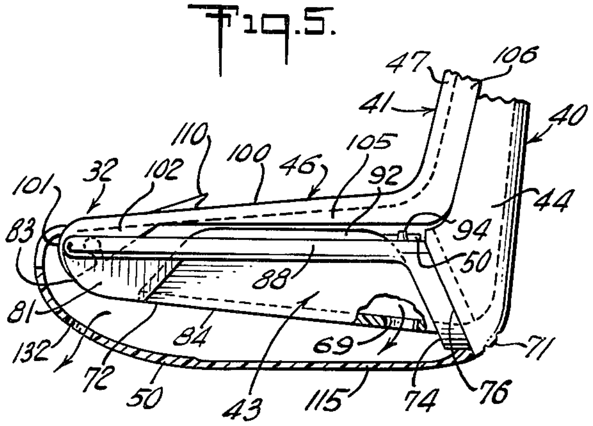
FIG. 5 is a side elevation of the head of the holder consisting of a lower rigid member, an upper rigid member hingedly connected thereto, and a resilient boot extending over the lower member, and shows the resilient boot broken away to reveal the interior structure of the head.

FIGS. 1 and 2 show a holder 30 in the form of a club constituting an embodiment of the present invention and comprising a handle 31 and a head 32 attached thereto. The handle 31 is of rigid material, which can be easily cleaned and kept sanitary, such as molded polystyrene. As a feature of the present invention, the handle 31 is offset from the head 32 by a step 33 between the handle and the head, angled in relation to the handle and the head to bring the longitudinal line of action B of the handle to the approximate center of the cleaning swab 10 on the head. With the handle 31 so offset, the pressures applied to the handle in the direction of its length during cleaning operations are transmitted to the swab 10 through the head with maximum intensity. Thereby, the necessary pressure on the holder for cleaning action can be applied mainly as an end thrust on the handle 31 by grasping the handle 31 with the five fingers of the user's hand and pushing endwise of the handle without applying large bending moments to the handle through a thumb, as is necessary in known holders in which the handle connects into the head with continuously changing curvature. As a result of this feature, the holder can be manipulated for cleaning operations with comfort and less fatigue than is permitted with known holders. Of course, pressure applied through the thumb on the handle 31 may also be useful in the manipulation of the holder 30, but is not required to the extent required by known cleaning devices.

Figure 6:
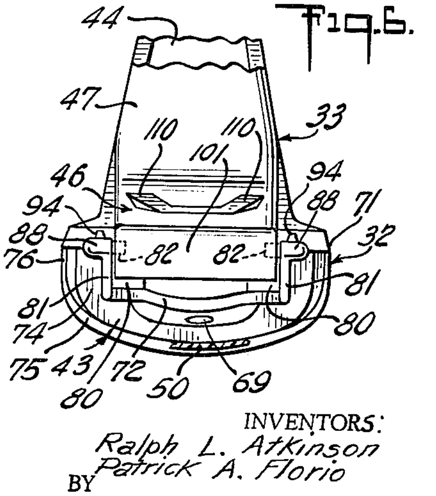
FIG. 6 is a front elevation of the head of the holder, but shows the resilient boot broken away to reveal the interior structure of the head.

The holder 30 is of split design to rupture the swab 10 after use and towards that end, the holder comprises two opposed members 40 and 41 (FIGS. 1–6) of rigid material, such as polystyrene, hingedly jointed together in superposed relation. The lower holder member 40 is of unitary construction and comprises a handle section 42 and a head section 43 interconnected by an intermediate offset or step section 44; the upper holder member 41 is also of unitary construction and comprises a handle section 45 and a head section 46 interconnected by an intermediate offset or step section 47. The two handle sections 42 and 45 are of complemental contour and come together in opposed relationship to form conjointly the handle 31, the two offset sections 44 and 47 are also of complemental contour and come together in opposed relationship to form conjointly the step 33 of the holder 30, and the head sections 43 and 46 conjointly form the rigid part of the holder and are joined together at the toe or forward end of the head for hinge swab rupturing action, as will be more fully described. The offset sections 44 and 47 progressively decrease in sidewise width from the head sections 43 and 46 respectively upwardly towards the handle sections 42 and 45 respectively, as shown in FIGS. 2 and 6, to correspondingly taper the step 33 of the holder 30 upwardly towards the handle 31.

A boot 50 of resilient material, such as polyethylene, fits over and is attached to the lower head section 43, in a manner to be described, to form with the head sections 43 and 46 the complete holder head 32 and to provide said head with a resilient sole and resilient side faces.

The two handle sections 42 and 45 are channelled on the inside to make said handle sections hollow and conjointly present externally a generally square contour with round corners to afford an outer surface which can be firmly gripped. The upper handle section 45 has a shallow recess or depression 51 on its upper surface extending therealong to receive the thumb of the hand which grasps the upper part of the handle 31, so that the handle 31 can be gripped firmly and comfortably, either for the application of end thrust or for thumb applied levering pressure.

A peripheral raised portion 52 on the handle sections 42 and 45 located a little over a palm's length from the outer end of the handle sections serves to isolate and indicate the palm graspable section 53 of the handle 31.

To hold the two handle sections 42 and 45 releasably together, the upper handle section 45 has a latch pin 54 extending from the extreme outer end therefrom and the lower handle section 42 has a latch flange 55 with a catch opening 56 therein for the latch pin. This catch opening 56 has a straight outer pin camming edge 57 and the latch pin 54 has its outer edge 58 bevelled and terminating in a shallow notch 60 near its base. The latch pin 54 is so located with respect to the catch opening 56 that the pin does not pass freely through said opening but must be forced therethrough, and is cammed by the outer edge 57 of said opening sufficiently to allow said pin to pass through said opening. By pressing the two handle sections 42 and 45 together near the grip portion 53 of the handle 31, the pin 54 will enter the catch opening 56 until the edge 57 of the catch opening snaps into the notch 60 in the pin. In this position, shown in full lines in FIG. 1, the two handle sections 42 and 45 will be latched together in closed position against separation laterally and against relative sliding movement across each other. To release the latch connection, the pin 54 is forced out of the opening 56, as for example, by thumb pressure.

The latch flange 55 extends beyond the latch opening 56 therein and the extension has a hole 61 for hanging the holder 30 when not in use.

To hold the two handle sections 42 and 45 from relative sideways displacement across each other, the two handle sections have integral therewith in the channels thereof at about a palm's length from the outer end of the holder 30, intermeshing plates 62 and 63, one of said plates having a tongue 64 and the other plate having a recess 65 for receiving said tongue, as shown in FIGS. 1 and 4.

The lower ends of the handle sections 42 and 45 have intermeshing plates 66 and 67 similar to the plates 62 and 63 to hold the two handle sections 42 and 45 from relative sideways displacement.

The lower head section 43 (FIGS. 6, 7, 8 and 12 to 15) is in the form of a channel of substantial depth and of substantially rectangular contour, elongated along the length of the head section and for that purpose comprises spaced side walls 70 extending substantially parallel along the length of said head section forwardly of the heel 71 and a bottom wall 72 integral with said side walls and having a hole 69 for drainage. The side channel walls 70 are spaced inwardly of the outer sides of the heel 71 and the bottom wall 72 is spaced above the bottom of this heel, so that this heel presents a forwardly facing U-shaped wall 74 around the channel walls 70 and 72 slanting downwardly and rearwardly from said channel walls. A recess 75 around the edge of the heel wall 74 forms a shoulder 76 for the rear edge of this boot 50, and in conjunction with said heel wall, serves to space the boot from the channel walls 70 and 72 to afford to said boot inward flexing space around said channel walls.

To form the hinge connections between the forward end or toe of the lower head section 43 and the upper head section 46, the side channel walls 70 have outward offsets 80 near the forward end of the bottom channel wall 72 and parallel forward wall extensions 81 in the form of ears projecting forwardly of said offsets and having integral therewith hinge pins 82 extending inwardly of said wall extensions transversely thereof. The space between the wall extensions 81 is such as to receive therein with a snug rotative fit the forward end or toe of the upper head section 46, and the forward edges 83 of these wall extensions curve downwardly and rearwardly to merge smoothly into the general contour of the lower surface 84 of the bottom channel wall 72 to provide a corresponding curved limiting support for the forward end section of the boot 50.

To receive the boot 50 on the lower head section 43, the upper edges of the side channel walls 70 have respective grooves 86 extending therealong to serve as rails for respective runners 87 on the boot during the assembling of the head 32 and to serve as a means for retaining the boot on the lower head section during cleaning. Also, the lower head section 43 has lateral outward flanges 88 extending along the full length of the lower head section from a rear shoulder 91 which merges into the shoulder 76, to the outer tips of the wall extensions 81, to serve as supports for the sides of the boot, as will be more fully described. The inner walls 92 of these grooves 86 extend above the outer walls 93 to serve as a guard rail for the upper sides of the boot 50.

To latch the boot 50 onto the lower head section 43 when the boot 50 has been slid to its limiting position against the shoulder 76, there are latch pins 94 integral with and extending upwardly from the flanges 88 respectively near the rear ends thereof for snap extension into respective holes 95 in the boot 50 near the rear thereof.

The upper head section 46 (FIGS. 5, 6, 7, 8, 14, 15, 16 and 17) is substantially rectangular and elongated along the length of the holder 30 and its width is slightly less than the distance between the confronting faces of the wall extensions or ears 81 of the lower head section 43, especially at the forward toe end of the upper head section, so that said forward end fits with a snug rotative fit between said faces. The upper head section 46 comprises a substantially flat rectangular top wall 100, a forward end wall 101 curved downwardly from said top wall and slanting slightly rearwardly, and side hinge walls 102 at the forward end of the upper head section extending from said top wall and said end wall and tapering rearwardly to said top wall. These side walls 102 have respective notches 103 slanting downwardly and rearwardly and adapted to receive the hinge pins 82 snugly therein. With the construction described, it is an easy matter to slip the forward end of the upper head section 46 between wall extensions or ears 81 of the lower head section 43 into position to cause the hinge pins 82 on said extensions to slip through the notches 103, to effect the hinge connection between the two head sections 43 and 46. The hinge connection between these head sections 43 and 46 will be maintained throughout the manipulation of opening the holder 30 to remove the used swab 10 thereon, and can only be broken by sliding the sections relatively along the length of the notches 103. Because of the inclination of the notches 103, such sliding movements are not encountered during this manipulation or during cleaning operation, so that the head sections 43 and 46 are not likely to be accidentally disconnected. However, if they are disconnected, it would be an easy manner to hingedly reconnect them together.

The front and side wall construction at the forward end of the upper head section 46, besides serving the hinge function described, also imparts rigidity to the forward end of the upper wall section. To impart further rigidity to the upper head section 46, especially where it joins into the offset section 46 of the holder member 41, the top wall 100 of the upper head section has depending side ribs 105 tapering forwardly towards said wall and forming continuations of side walls or ribs 106 on said offset section 46.

To latch the upper flap 17 of the swab 10 onto the holder head 32 automatically as it is slipped onto said head, the upper head section 46 has two symmetrically arranged hooks, spurs or flukes 110 diverging rearwardly and slanting from the upper surface of the top wall 100 upwardly and rearwardly to form catches for said flap.

The upper head section 46 extends at such an angle with respect to the handle section 45 and the offset or step section 47, that when the two hinged holder members 40 and 41 are brought together, not only will the handle sections 42 and 45 and the offset or step sections 44 and 47 come together in abutting face to face relationship, but the upper head section 46 will have the major part of its length in close proximity to the side flanges of the boot 50 embracing the lower head section 43, as shown in FIGS. 1, 5, 14 and 15.

Figure 7:
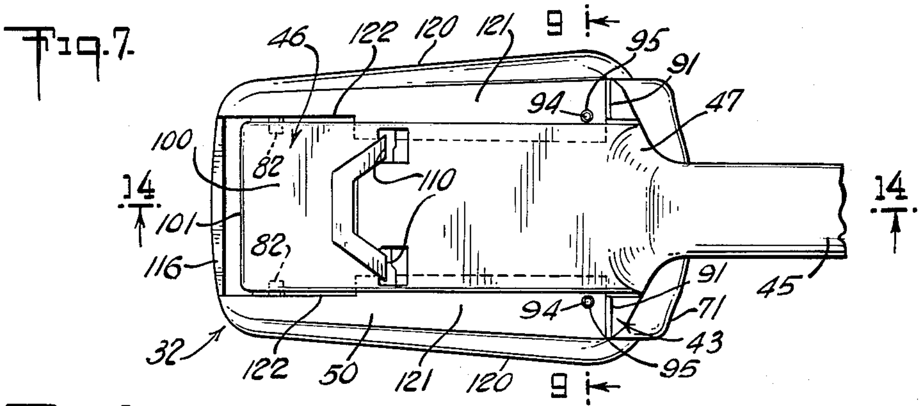
FIG. 7 is a top plan view of the head of the holder shown with the two rigid hinged members in closed position.
Figure 8:
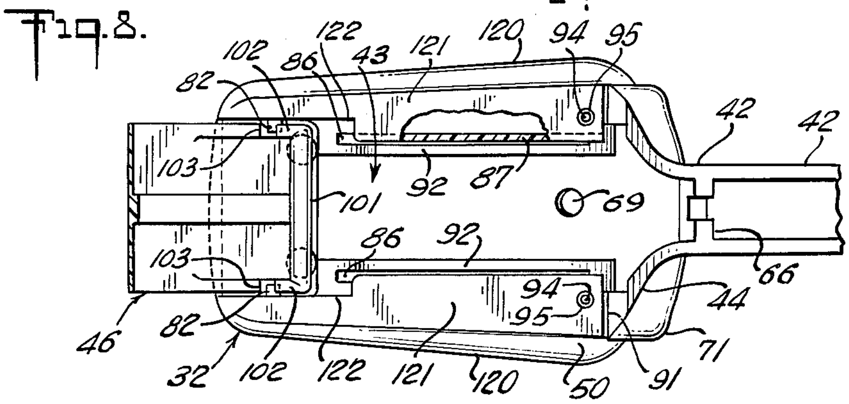
FIG. 8 is a top plan view of the head of the holder shown with the upper rigid hinged member in open position and with part of the resilient boot broken away.
Figure 9:
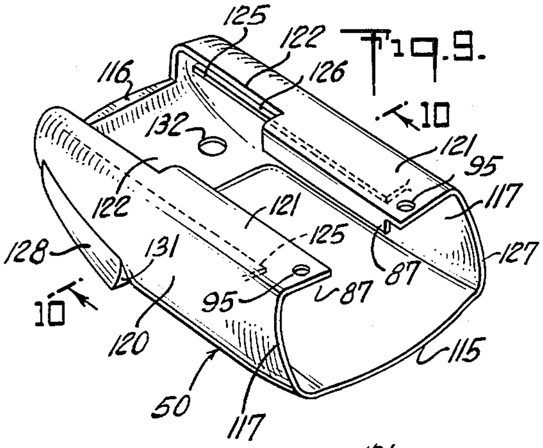
FIG. 9 is a perspective of the resilient boot.

The resilient boot 50 (FIGS. 5, 7, 8, 9, 10, 11, 14, 15, 16 and 17) is provided with a bottom wall 115 which slants longitudinally forwardly with convex curvature at the toe to form a shallow bow 116 and which extends longitudinally rearwardly with a slight curvature to form the sole of the holder head 32. The boot 50 also has side walls 117 merging into the bottom wall 115 with convex streamline curvature. The respective inner surfaces 118 of these side walls 117 are straight and parallel in the longitudinal direction of the holder head 32 and the distance therebetween when the boot 50 is embracing the lower head section 43 is substantially the distance between the parallel outer edges of the flanges 88 on the lower head section to cause said side walls to engage said flange edges with a close conforming fit. These side walls 117 increase progressively in thickness towards the rear to cause the outer surfaces 120 of these side walls 117 to converge forwardly, as shown in FIGS. 7 and 8, thereby facilitating the entry and withdrawal of the holder head 32 in restricted spaces during cleaning operations. Also, this tapering construction of the boot 50 permits easier assembly of the swab 11 onto the holder head 32.

The boot 50 also has top side flanges 121 projecting inwardly from the side walls 117 respectively of the boot and terminating in depending rims 87 extending into the rail grooves 86 of the lower head section 43 to serve as runners and as a means for retaining the boot onto the lower head section. These top flanges 121 have respective rectangular recesses 122 at their forward sections to permit the forward hinge section of the upper head section 46 to extend into the space between the wall extensions or ears 81 of the lower head section 43 for hinge action, as shown in FIGS. 7 and 8, and also to define forwardly facing shoulders on the top flanges 121 of the boot 50 at the ends of said recesses, to cause the upper head section 46 to block the withdrawal of the boot from the lower head section 43.

Since the internal depth of the boot 50 is greater than the external depth of the lower head section 43 creating a clearance between the bottom wall 72 of the lower head section 43 and the bottom wall 115 of the boot 50 when the boot is in proper position in relation to the lower head section, in order to support and confine the boot against upward movement relative to the lower head section, there are provided railings 125 extending longitudinally along and transversely inwardly from the inner surfaces 118 of the side walls 117 respectively of the boot and spaced below the top side flanges 121 of said boot sufficiently to form therewith and with said side walls guide channels 126 for slidably receiving the outer side sections of the side flanges 88 on the lower head section 43.

The rear edge 127 of the boot 50 is substantially in a plane inclined downwardly and rearwardly to abut the shoulder 76 on the heel wall 74 of the lower head section 43.

The boot 50 contains a pair of ridges 128 along the forepart of the boot on opposite sides of the bottom wall 115. These ridges 128 have their lower surfaces 130 substantially flush with the bottom surface of the bottom wall 115 and terminate at their rear ends in rearwardly facing shoulders 131 projecting from the lower longitudinal corners of the bottom of the boot and extending substantially in the transverse plane of the spurs or catches 110, to form catches for the lower flap 17 of the swab 10 and to effect thereby automatically latch engagement of said flap with said shoulders 131 when said swab is slipped onto the holder head 32. The shoulders 131, in conjunction with the spurs or catches 110, not only serve to secure the swab 10 to the holder head during use, but also secure the swab in position as it is being ruptured prior to disposal.

The bottom wall 115 has drain holes 132.

Figure 10:
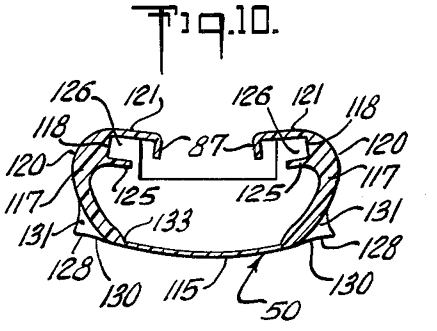
FIG. 10 is a transverse section of the resilient boot taken on lines 10—10 of FIG. 9 and shows the boot in relaxed position before attachment to the lower rigid hinged member.
Figure 11:
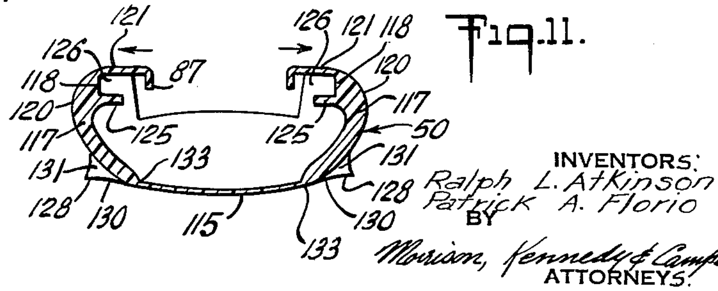
FIG. 11 is a transverse section of the resilient boot similar to that of FIG. 10 but shows the boot flexed for attachment to the lower rigid hinged member.
Figure 12:
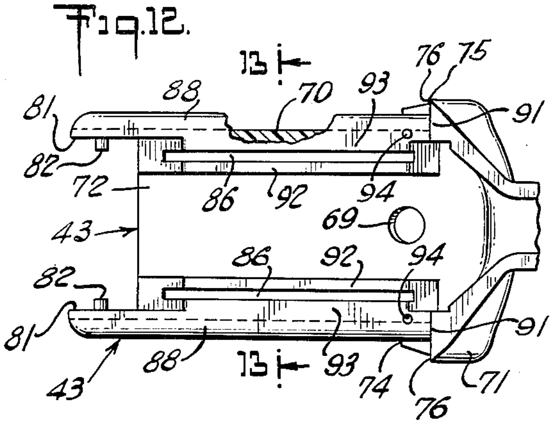
FIG. 12 is the top plan view of the lower rigid hinged member of the holder head.
Figure 13:
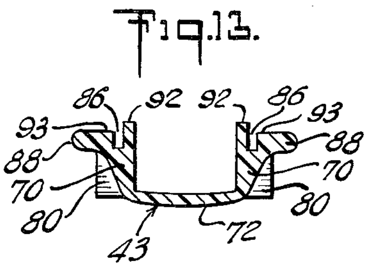
FIG. 13 is a transverse section of the lower rigid hinged member of the holder head taken on lines 13—13 of FIG. 12.

The boot 50 is constructed so that in relaxed position before attachment to the lower head section 43, it is in the form shown in FIG. 10 with its side walls 117 sufficiently close together, so that it can be slid onto the lower head section in the manner to be described. The bottom wall 115 of the boot 50 is substantially thinner than the side walls 117 of the boot, so that hinges 133 in effect are formed where said bottom wall meets said side walls. The boot 50 can thereby be flexed against its inherent resiliency about these hinges 133, as shown in FIG. 11, to spread its side walls 117, so that the boot can be slid onto the lower head section 43. Since the boot 50 tends to return to its relaxed position shown in FIG. 10 when the spread boot is slid onto the lower head section 43 in embracing position, its side walls 117 will press yieldably against the outer sides of the top flanges 88 of the lower head section, thereby assisting in retaining the boot snugly on said lower head section. The extension of the forward hinge section of the upper head section 46 into the space between the wall extensions or ears 81 of the lower head section 43 for hinge connection thereto, serves to positively retain the boot 50 on the lower head section, as described.

It should be noted that ont only the bottom wall 115 also serve to cause said bottom wall to flex inwardly and outwardly about said hinges and into conformance with the surface being cleaned during use of the cleaning device.

It should be noted that not only the bottom wall 115 of the boot 50 is spaced from the bottom wall 72 of the lower head section 43, but the side walls 117 of the boot are spaced from the side walls 70 of the lower head section, so that both the bottom wall and the side walls of the boot can flex inwardly during cleaning.

To assemble the three parts 40, 41 and 50 of the holder 30, the boot 50 is first slipped over the lower head section 43 by slipping the boot, while spread into the form shown in FIG. 11, endwise over the forward end of the lower head section with the side flanges 88 of the lower head section confined in the guide channels 126 of the boot and with the runners 87 on said boot extending downwardly into the rail grooves 86 on said lower head section, until the rear edge 127 of the boot abuts the shoulder 76 on the heel wall 74 of the lower head section 43. In this position of the boot 50, the latch pins 94 on the lower head section 43 will snap into holes 95 in the boot to hold the boot in position.

With the boot 50 in place, the upper head section 46 is hinged to the lower head section 43 by slipping the forward end of the upper head section between the wall extensions or ears 81 of the lower head section 43 into position to cause the hinge pins 82 on said extensions to slip through the notches 103 on the side walls 102 of the upper head section 46, to effect the hinge connection between the two head sections 43 and 46.

With the parts 40, 41 and 50 of the holder 50 assembled as described, the swab 10 is slipped for cleaning operations over the head 32 of the holder 30 while the two holder members 40 and 41 are latched together in closed position, as shown in FIGS. 1 and 23. When the swab 10 is in place, the free ends of its internal flaps 17 extend rearwardly beyond the catches 110 of the upper head section 46 and the catches 131 on the boot 50 and are latched to said catches, as shown in FIG. 23. The swab 10 so latched and locked to the head 32 of the holder 30 cannot be removed therefrom without rupturing the swab.

After cleaning operation has been completed, the latch pin 54 is released at the grip end of the two handle sections 42 and 45 by thumb manipulation, and the two sections are then pulled to cause them to open about the axis of the hinge connection at the forward end of the holder head 32. This causes the side seams 22 of the swab 10 to be broken and the swab to be ruptured, as shown in FIG. 19. In this ruptured condition, the swab 10 will easily fall off the holder head 32 or can be easily stripped off by pulling along the edge of the bowl, without direct contact with the swab. The ruptured swab 10 will drop into the bowl, and since it is opened, the filler mat 11 will be exposed immediately to the distintegrating action of the water in the bowl, enabling the components of the swab to be easily washed away by flushing and without danger of clogging the drain.

The holder 30 constructed as described, instead of having a head shaped like a flat spoon or spatula, has more body and curvature to conform more easily to rounded shapes and contours, such as are found in toilet bowls and bath tubs. Also, the holder 30 is designed for comfort during usage, and to that end the vectors of forces applied to the handles are distributed in the manner described to effect such comfort.

The resilient feature of the boot 50 permits the swab 10 to function more efficiently, since the boot conforms more closely to the inner contours of the swab. As the swab 10 is wetted, it will be fully supported by the boot 50 and will not fold and roll into large creases as is the case when the holder head is solid throughout.

The flexible nature of the boot 50 affords greater comfort in use, since it permits the person using the cleaning device to exert more pressure during cleaning. Since the head 32 reacts with resilient pressure, it conveys the feeling of strength and diminishes the feeling that it might shatter in use.

Since the holder head 32 contains swab catches on the top and bottom of the head symmetrically arranged on opposite sides of its longitudinal center line, the swab 10 is positively held in balanced position, so that in use, the bottom portion of the swab does not slip and roll up into a ball as might be the case if the catches were only on the top or on the bottom.

While the invention has been described with particular reference to a specific embodiment, it is to be understood that it is not to be limited thereto but is to be construed broadly and restricted solely by the scope of the appended claims.

What is claimed is:

1. A cleaning device holder comprising a handle of rigid material split along its length into two complemental sections and a head adapted to receive a cleaning swab in the form of a cover and comprising an upper section of rigid material, a lower section of rigid material, said sections being connected to the ends of said handle sections respectively and being hinged together at their forward toe ends, and a boot fitted over the bottom and sides of the lower head section to form a sole for said head and made of resilient material to permit the swab on the head to be pressed into conformance with the surfaces to be cleaned upon application of cleaning pressure applied to said head through the rigid handle.

2. A cleaning device holder as described in claim 1, wherein said lower head section is in the form of a channel extending lengthwise of said head and having a bottom wall and side walls, and said boot has a bottom wall extending below and along the bottom wall of said lower head section, side walls flanking the side walls of said lower head section, and side flanges projecting inwardly from the top of the side walls of said boot and extending across the tops of the side walls of said lower head section in close proximity to the latter side wall tops.

3. A cleaning device holder as described in claim 1, wherein said lower head section has a bottom wall and side walls extending lengthwise of the head and provided with respective grooves extending along the tops of said side walls, and said boot has a bottom wall extending below and along the bottom wall of said lower head section, side walls flanking the side walls of said lower head section, side flanges projecting inwardly from the tops of the side walls of said boot and extending across the tops of the side walls of said lower head section, in close proximity to the latter side wall tops, and rims depending from the longitudinal inner sides of said side flanges and extending into said grooves respectively.

4. A cleaning device holder as described in claim 1, wherein said lower head section has a bottom wall, side walls extending along the length of the head, and side flanges extending laterally outwardly from the tops of said side walls, and said boot has a bottom wall extending below and along the bottom wall of said lower head section, side walls flanking the side walls of said lower head section, side flanges projecting inwardly from the tops of the side walls of said boot and extending across the tops of the side walls of said lower head section in close proximity to the latter side wall tops, and means forming channels along the inner faces of the side walls of said boot receiving the flanges on the side walls of said lower head section.

5. A cleaning device holder as described in claim 1, wherein said lower head section is in the form of a channel extending lengthwise of said head and having a bottom wall, side walls with respective grooves extending along the tops of said side walls, and side flanges extending laterally outwardly from the tops of said side walls, and said boot has a bottom wall extending below and along the bottom wall of said lower head section, side walls flanking the side walls of said lower head section, side flanges projecting inwardly from the tops of the side walls of said boot and seated on the flanges on the side walls of said lower head section, rims depending from the longitudinal inner sides of said side flanges and extending into said grooves respectively, and means forming channels along the inner faces of the side walls of said boot receiving the flanges on the side walls of said lower head section.

6. A cleaning device holder comprising a handle of rigid material split along its length into two complemental sections and a head adapted to receive a cleaning swab in the form of a cover and comprising an upper section of rigid material, a lower section of rigid material, said head sections being hinged together at their forward toe ends, and a boot with a bottom wall fitted over the bottom and sides of the lower head section to form a sole for said head and made of resilient material to permit the swab on the head to be pressed into conformance with the surfaces to be cleaned upon application of cleaning pressure applied to said head through the rigid handle, said lower head section having a bottom wall extending from its rear end near the handle to a region near its forward end and having also means for supporting said boot with the bottom wall of said boot extending along and spaced below the bottom wall of said lower head section when the holder is free from cleaning pressure to define a clearance between said two bottom walls.

7. A cleaning device as described in claim 6, wherein said boot supporting means also comprises means for spacing the side walls of the boot from the side walls of the lower head section, permitting thereby the bottom and side walls of the boot to flex inwardly under cleaning pressure.

8. A cleaning device comprising a handle split along its length into two complemental sections and a head at the end of said handle adapted to receive a cleaning swab in the form of a cover and comprising an upper section and a lower section connected to said handle sections respectively, the lower head section having side walls extending along the length of the head to the forward toe end of said lower head section and separated by a space near the forward toe end of the head, and axially aligned hinge pins rigid with and extending inwardly in said space from the inner faces of said side walls near the forward toe end of said lower head section, said upper head section having side walls near the forward toe end of the upper head section with respective notches, said upper head section near its forward end extending with a substantially snug rotative fit in said space with said hinge pins extending into said notches respectively to form a hinge connection between said head sections.

9. A cleaning device holder comprising a handle of rigid material split along its length into two complemental sections, a head of rigid material comprising an upper section and a lower section connected to the ends of said handle sections respectively, the lower head section having side walls extending along the length of the head to the forward toe end of said lower head section and separated by a space near the forward toe end of the head, and a bottom wall between said side walls, the forward toe end of said upper head section extending with a substantial snug rotative fit into said space between said side walls, said head comprising a hinge connection between the forward toe ends of said head sections, and a boot of resilient material fitted over said lower head section and having a bottom wall extending along and below the bottom wall of said lower head section, side walls flanking the side walls of said lower head section, and side flanges extending along the tops of the side walls of said boot and inwardly therefrom, said top flanges extending over the tops of the side walls of said lower head section, said flanges defining forwardly facing shoulders extending inwardly of the outer sides of said upper head section near the forward end of said upper head section, and rearwardly of the region where said upper head section extends into said space to serve as a limiting stop to prevent the boot from slipping off said lower head section.

10. A cleaning device holder comprising a handle of rigid material split along its length into two complemental sections and a head adapted to receive a cleaning swab in the form of a cover and comprising an upper section of rigid material and a lower section of rigid material, said sections being connected to the ends of said handle sections respectively and hinged together at their forward toe ends, and a boot fitted over the bottom and sides of the lower head section to form a sole for said head, and made of resilient material to permit the swab on the head to be pressed into conformance with the surfaces to be cleaned upon application of cleaning pressure applied to said head through the rigid handle, said sole having bottom and side walls, and ridges along the forward section of said boot extending lengthwise of said boot and located in the regions where said side walls meet said bottom wall, said ridges defining at their rear ends catches for latch engagement with an internal flap in said cleaning swab when the swab is slipped over said head.

11. A cleaning device holder comprising a handle of rigid material split along its length into two complemental sections and a head adapted to receive a cleaning swab in the form of a cover having two opposed internal flaps, said head comprising an upper section of rigid material, a lower section of rigid material, said sections being connected to the ends of said handle sections respectively and being hinged together at their forward toe ends, catch means on the top of said upper head section in position to engage one of said flaps automatically when the swab is slipped over said head to latch the swab onto said head and to hold the swab against withdrawal from said head, and a boot fitted over the bottom and sides of the lower head section, and made of resilient material to permit the swab when on the head to be pressed into conformance with the surfaces to be cleaned upon application of cleaning pressure applied to said head through the rigid handle, and catch means on said boot near the bottom thereof in position to engage the other flap automatically when the swab is slipped over said head to latch the swab to said head through the latter flap.

12. A cleaning device holder comprising a handle of rigid material split along its length into two complemental sections and a head adapted to receive a cleaning swab in the form of a cover and comprising an upper section of rigid material, a lower section of rigid material, said head sections being hinged together at their forward toe ends, and a boot with a bottom wall fitted over the bottom and sides of the lower head section to form a sole for said head and made of resilient material to permit the swab when on the head to be pressed into conformance with the surfaces to be cleaned upon application of cleaning pressure applied to said head through the rigid handle, said lower head section having a bottom wall extending from its rear end near the handle to a region near its forward end and having also means for supporting said boot with the bottom wall of said boot extending along and spaced below the bottom wall of said lower head section when the holder is free from cleaning pressure to define a clearance between said two bottom walls, said boot having side walls thicker than the boot wall of said boot to form hinge junctures between the side walls of the boot and the bottom wall of the boot permitting flexing of the bottom wall of the boot about said hinge junctures.

References Cited by the Examiner

UNITED STATES PATENTS

| | | | |
|---|---|---|---|
| 719,596 | 2/1903 | Lauterbach | 15—209 X |
| 1,509,381 | 9/1924 | Townsend | 15—210 X |
| 2,172,676 | 9/1939 | Griffith | 15—231 |
| 2,679,064 | 5/1954 | Palma et al. | 15—244 |
| 2,996,744 | 8/1961 | Rodgers et al. | 15—210 |
| 2,998,614 | 9/1961 | Winch | 15—210 |
| 3,097,385 | 7/1963 | Unterbrink | 15—210 X |

FOREIGN PATENTS

| | | |
|---|---|---|
| 5,539 | 9/1892 | Switzerland. |

CHARLES A. WILLMUTH, *Primary Examiner.*

WALTER A. SCHEEL, *Examiner.*